United States Patent
Bhargava et al.

(10) Patent No.: US 9,384,579 B2
(45) Date of Patent: Jul. 5, 2016

(54) STOP-MOTION VIDEO CREATION FROM FULL-MOTION VIDEO

(71) Applicant: Adobe Systems Incorporated, San Jose, CA (US)

(72) Inventors: Akshat Bhargava, New Delhi (IN); Rinky Gupta, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 45 days.

(21) Appl. No.: 14/476,214

(22) Filed: Sep. 3, 2014

(65) Prior Publication Data

US 2016/0063750 A1    Mar. 3, 2016

(51) Int. Cl.
*G06T 13/00* (2011.01)
*G06T 13/20* (2011.01)

(52) U.S. Cl.
CPC ....... *G06T 13/20* (2013.01); *G06T 2207/10021* (2013.01)

(58) Field of Classification Search
None
See application file for complete search history.

(56) References Cited

U.S. PATENT DOCUMENTS

| | | | |
|---|---|---|---|
| 2004/0075677 A1* | 4/2004 | Loyall | G10L 13/00 715/706 |
| 2005/0066279 A1* | 3/2005 | LeBarton | G06T 13/00 715/723 |
| 2009/0046097 A1* | 2/2009 | Franklin | G06T 13/00 345/419 |
| 2011/0123124 A1* | 5/2011 | Peters | G06F 17/3025 382/225 |

OTHER PUBLICATIONS

Adobe; "Using Adobe Premiere Elements 9;" 2010; p. 50-53.*
Zhang et al.; "Automatic partitioning of full-motion video"; 1993; Multimedia Systems; pp. 10-28.*

* cited by examiner

*Primary Examiner* — Peter Hoang
(74) *Attorney, Agent, or Firm* — Wolfe-SBMC

(57) ABSTRACT

In embodiments of stop-motion video creation from full-motion video, a video of an animation sequence is filmed with a video camera that captures an animation object and manipulations to interact with the animation object. Motion frames of the video are determined, where the motion frames depict motion as the manipulations to interact with the animation object. The motion frames may also depict other motion, other than the manipulations to interact with the animation object, where the other motion is also captured when the video is filmed. The motion frames that depict the motion in the video are discarded, leaving static frames that depict the animation object without any detectable motion. A frame sequence of the static frames can then be generated as a stop-motion video that depicts the animation object to appear moving or created without the manipulations.

20 Claims, 6 Drawing Sheets

STOP-MOTION VIDEO CREATION FROM FULL-MOTION VIDEO

BACKGROUND

A stop-motion video utilizes an animation technique to make an object appear to move on its own, or a sketch to appear as it is being drawn, but without seeing the artist performing the drawing strokes to create the sketch. Each small part of the sketch that is being drawn can be individually photographed and then played back for viewing as a continuous sequence, creating the appearance of the sketch being drawn without an artist. Similarly, an object, or part of the object, can be moved or repositioned in small increments between individually photographed image frames, creating the appearance of the object moving when the series of image frames is played back for viewing as a continuous sequence. Generally to create a stop motion video, not only does a user have to photograph all of the individual image frames, but also import all the image frames into a video editing application, select the image frames needed to create the animation appearance, correlate them to a timeline, and then export the selected image frames to be stitched into a stop-motion video. Typically, this is a very time consuming and complex process.

SUMMARY

This Summary introduces features and concepts of stop-motion video creation from full-motion video, which is further described below in the Detailed Description and/or shown in the Figures. This Summary should not be considered to describe essential features of the claimed subject matter, nor used to determine or limit the scope of the claimed subject matter.

Stop-motion video creation from full-motion video is described. In one or more embodiments, a video of an animation sequence can be filmed with a video camera that captures an animation object and the manipulations to interact with the animation object. Motion frames of the video are determined, where the motion frames depict motion as the manipulations to interact with the animation object. The motion frames may also depict other motion, other than the manipulations to interact with the animation object, where the other motion is also captured when the video is filmed. The motion frames that depict the motion in the video are discarded, leaving static frames that depict the animation object without any detectable motion. A frame sequence of the static frames can then be generated as a stop-motion video that depicts the animation object to appear moving or created without the manipulations.

In the described techniques, an animation object may be a sketch and the manipulations are filmed as the individual drawing strokes of the sketch. The motion frames depict the motion of drawing the individual strokes, and the static frames depict the individual strokes completed after having been drawn. Alternatively, the animation object may be a three-dimensional (3D) object and the manipulations are filmed as the 3D object being moved, or a part of the 3D object being moved. The motion frames depict the motion of the 3D object or the part of the 3D object being moved, and the static frames depict the 3D object after the 3D object, or the part of the 3D object, has been moved.

The motion frames of the video can be determined based on velocities of objects that are captured when the video is being filmed. For example, an artist's hand (e.g., an object) may enter into the viewable area of the video, add a small drawing stroke to a sketch, and then leave the viewable area of the video. These are all examples of motion that is captured when the video is being filmed, and the motion frames have velocities of the object that are greater than zero velocity. The velocities corresponding to the static frames of the frame sequence used to generate the stop-motion video are zero velocities, where the static frames have no detectable motion. Alternatively, the motion frames may be determined based on a motion threshold, where an image frame having the slightest of motion may be used in the frame sequence along with the static frames to generate the stop-motion video. A motion sensitivity input can be received from a user to change the motion threshold, and the frame sequence of the static frames may then include one or more of the motion frames that have the velocities that are greater than the zero velocities based on the change to the motion threshold.

In embodiments of the described techniques, a group of the static frames that depict the animation object the same can be determined, such as for several, consecutive image frames of a video that show the animation object without any change or movement. One or more of the static frames from the group can then be selected as representative frames that depict the animation object the same in the stop-motion video. In other embodiments, an input can be received as a duration of time over which the stop-motion video will playback for viewing, such as if a user designates a thirty-second video, or a one-minute video. The number of the static frames in the frame sequence can then be selected based on the designated duration of time. For example, a fewer number of the static frames in the frame sequence will be selected for the thirty-second video than for the one-minute video. Alternatively, more of the static frames will be selected for the frame sequence for a longer video and, optionally, may include one or more of the motion frames that have the velocities that are greater than the zero velocities based on the change to the motion threshold, as described above.

BRIEF DESCRIPTION OF THE DRAWINGS

Embodiments of stop-motion video creation from full-motion video are described with reference to the following Figures. The same numbers may be used throughout to reference like features and components that are shown in the Figures.

DETAILED DESCRIPTION

Figure 1:
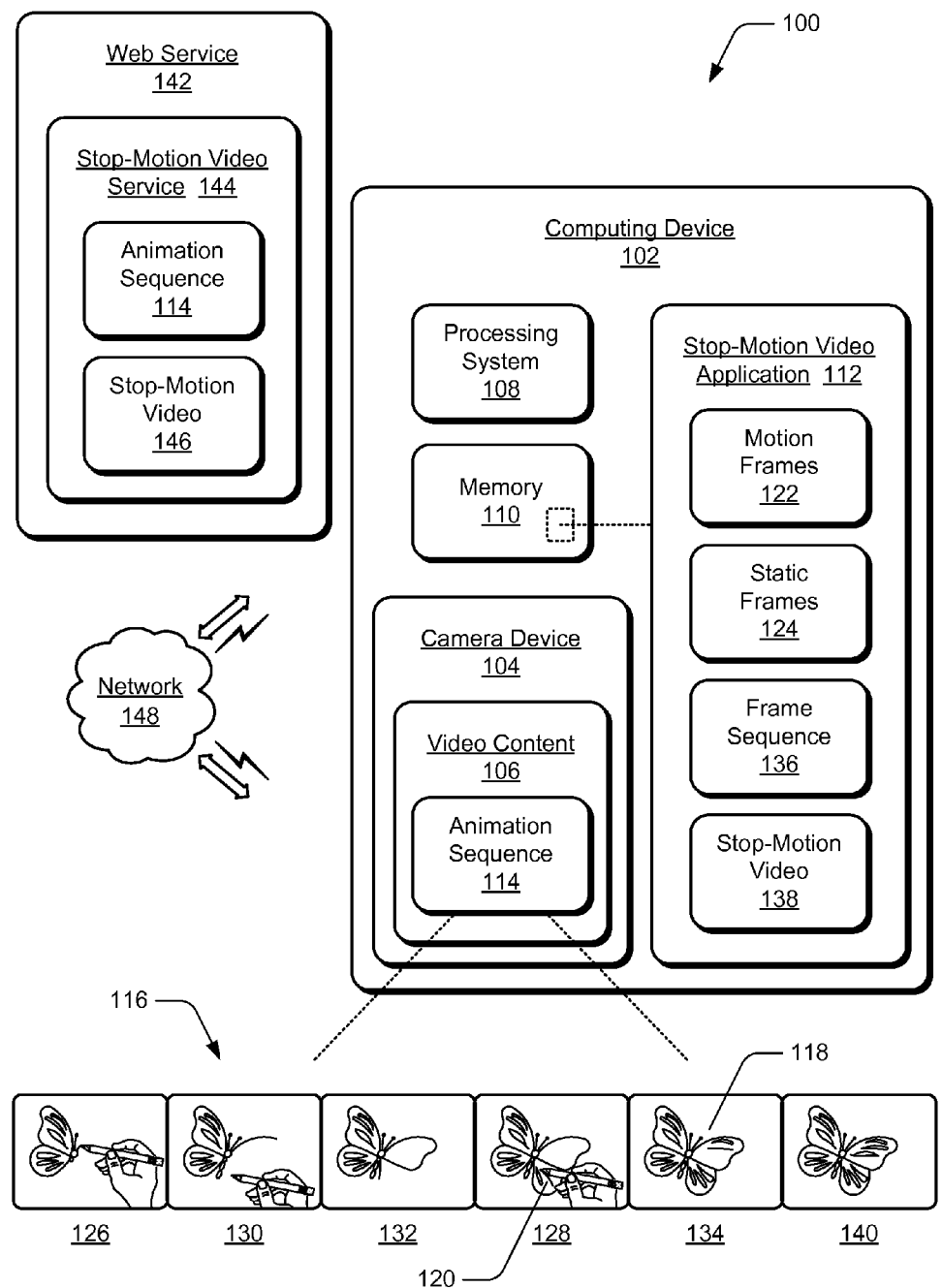
FIG. 1 illustrates an example system in which embodiments for stop-motion video creation from full-motion video can be implemented.

Techniques for stop-motion video creation from full-motion video are described, and provide that a user can quickly and easily create a stop-motion video by discarding image frames of a full-motion video that depict motion, and by selecting image frames of the video that do not include objects in motion. The user can capture the entire process to incrementally draw a sketch or move an object in small increments as a full-motion video with a video camera, rather than taking individual photos of each incremental change to the sketch or the object. A stop-motion video application can then import the video, from which the stop-motion video is created. A time duration over which the stop-motion video will playback for viewing can be selected, and the stop-motion video application is implemented to determine image frames from the video used to generate a frame sequence as the stop-motion video.

Generally, a stop-motion video is an animation technique to make an object appear to move on its own, or a sketch to appear as it is being drawn, but without seeing the artist performing the drawing strokes to create the sketch. Each small part of the sketch that has been drawn can be individually captured on one or more image frames and then played back for viewing as a continuous sequence, creating the appearance of the sketch being drawn without an artist. Similarly, a three-dimensional (3D) object, or part of the object, can be moved or repositioned in small increments between individually captured image frames, creating the appearance of the 3D object moving on its own when the series of image frames is played back for viewing as a continuous sequence.

The stop-motion video application can determine motion frames of the video that depict any type of motions (e.g., objects, hands, shadows, and the like) that are related to the manipulations to interact with an animation object, such as to draw the sketch or move the object. The video can be divided into time-segments of static frames and the motion frames, based on the activity or motion detection. The stop-motion video application can then discard the motion frames as the time-segments of the video that include activity or motion, leaving the static frames as the time-segments of the video that depict the animation object without any detectable motion. The frame sequence of the static frames can then be generated as the stop-motion video that depicts the animation object (e.g., the sketch or the 3D object) to appear moving or created without the manipulations or related motions of other objects (e.g., an artist's hand adding a segment to the sketch, or a user moving the 3D object). The stop-motion video can be generated based on the desired time duration over which the stop-motion video will playback for viewing, and static frames are selected from each static time-segment and arranged sequentially. For example, if the desired duration to playback the video for viewing includes a "k" number of image frames and the number of static time-segments is "s", then k/s frames from each static time-segment of the video are selected and arranged sequentially as the frame sequence of the stop-motion video.

In embodiments, the stop-motion video application can be implemented in a camera device, such as a portable camera that may be used to take videos and capture photos as digital images. Additionally, the stop-motion video application may be implemented in any type of portable and/or communication device, such as a cell phone that includes a camera device to capture photos and videos. Further, the stop-motion video application may be implemented as a cloud-based service that is accessible from a computing device or cell phone via the Internet, or as a mobile application, an application plug-in, an application extension, and the like. For example, a user may capture a full-motion video of an animation sequence, and then upload the video to the cloud-based service that implements the stop-motion video application to generate a stop-motion video from the full-motion video. The stop-motion video can then be downloaded to a requesting computing device for playback and viewing, or made available for cloud-based access available from anywhere, such as when made available via the Internet, on an intranet site, on an external website, or any other similar location for on-line and/or network-based access.

While features and concepts of stop-motion video creation from full-motion video can be implemented in any number of different devices, systems, networks, environments, and/or configurations, embodiments of stop-motion video creation from full-motion video are described in the context of the following example devices, systems, and methods.

FIG. 1 illustrates an example system 100 in which techniques for stop-motion video creation from full-motion video can be implemented. The example system 100 includes a computing device 102, such as any type of portable electronic, computer, mobile phone, tablet device, media playback device, and other computing, communication, gaming, entertainment, and/or electronic media devices. The computing device 102 includes a camera device 104 that is implemented to capture video content 106. In embodiments, the computing device 102 may be implemented as the camera device 104 itself, such as portable digital camera. The example computing device 102 can include a wired and/or battery power source to power device components, such as a processing system 108. The computing device can also include memory 110, as well as any number and combination of components as further described with reference to the example device shown in FIG. 6.

In this example system 100, the computing device 102 includes a stop-motion video application 112 that can be implemented as a software application or module (e.g., executable instructions) stored on computer-readable storage memory, such as any suitable memory device or electronic data storage (e.g., the memory 110). The computing device 102 can be implemented with computer-readable storage memory as described with reference to the example device shown in FIG. 6. In embodiments, the stop-motion video application 112 includes image processing algorithms that implement the techniques for stop-motion video creation from full-motion video described herein.

The camera device 104 (e.g., a video camera) can be utilized to film a video of an animation sequence 114 that captures an animation object and the manipulations to interact with the animation object. The video of the animation sequence 114 is a full-motion video that is filmed as the video content 106, and an example of the animation sequence is shown at 116. In this example, the animation object 118 is a sketch and the manipulations are individual drawing strokes 120 of the sketch. The animation sequence 114 includes motion frames 122 and static frames 124. In embodiments, the stop-motion video application 112 can receive the animation sequence 114 from the camera device 104 as the video content 106. The stop-motion video application is implemented to then determine the motion frames 122 of the video, where the motion frames depict motion as the manipulations to interact with the animation object. The motion frames of the video may depict any type of motions (e.g., objects, hands, shadows, and the like) that are related to the manipulations to interact with an animation object, such as to draw the sketch or move an object.

For example, the animation sequence shown in the example at 116 includes motion frames 122 that depict motions, such as motion frames 126 and 128 that each include a manipulation (e.g., by an artist) interacting to draw an individual stroke 120 of the sketch, which is the animation object 118. The motion frames 122 of the animation sequence 114 may also depict other motion other than the manipulations to interact with the animation object, where the other motion is captured when the video content is filmed. For example, the animation sequence shown at 116 includes a motion frame 130 that depicts the artist's hand entering into, or out of, the viewable area of the video. The artist's hand may enter into the viewable area of the video, add a small drawing stroke to the sketch, and then leave the viewable area of the video. Other subtle motion may also be captured in the video, such as a shadow of the artist's hand that enters into the viewable area of the video before the hand is viewable. These are all examples of motion that is captured when the video is being filmed.

The stop-motion video application 112 is implemented to then discard the motion frames 122 that are determined from the animation sequence 114, thus leaving the static frames 124 that depict the animation object 118 without any detectable motion. For example, the animation sequence shown in the example at 116 includes static frames 132 and 134 that depict the individual strokes of the sketch completed after having been drawn. Further, there is no other detectable motion in the static frames 132 and 134 of the animation sequence. The stop-motion video application 112 can then generate a frame sequence 136 of the static frames 124 as a stop-motion video 138 that depicts an animation object to appear being created or moving without the manipulations. For example, the frame sequence 136 includes the static frames 132 and 134, as well as a static frame 140 that depicts the completed sketch of the animation object 118, and the frame sequence can be played back for viewing as the stop-motion video 138.

It should be noted that the animation sequence shown in the example at 116 depicts only a very few image frames of the video content 106 simply for discussion and illustrative purposes. In practice, the video content of the animation sequence 114 would include several hundred or thousands of image frames, with many more motion frames 122 and many more static frames 124. This is shown and described further with reference to FIG. 2.

Although not shown, a similar example of an animation object may be a three-dimensional (3D) object, rather than a sketch or other similar item. The camera device 104 (e.g., a video camera) can be utilized to film the video content 106 of the animation sequence 114 that captures the 3D object, as well as the manipulations to interact with the 3D object. The stop-motion video application 112 can determine the motion frames 122 that depict the motion of the 3D object or a part of the 3D object being moved. The static frames 124 depict the 3D object after the 3D object or the part of the 3D object has been moved. The stop-motion video application 112 is implemented to then discard the motion frames 122 that are determined from the animation sequence 114, and generate the frame sequence 136 of the static frames 124 as a stop-motion video 138 that depicts the 3D object to appear moving without the manipulations.

The example system 100 also includes a Web service 142 that users can access via the computing device 102. The Web service 142 can include cloud data storage implemented as any suitable memory, memory device, or electronic data storage for network-based data storage. The Web service 142 can also include a server device that is representative of one or multiple hardware server devices. The Web service 142 can be implemented with various components, such as a processing system and memory, as well as with any number and combination of components as further described with reference to the example device shown in FIG. 6.

The Web service 142 implements a stop-motion video service 144 that can be implemented as a software application or module (e.g., executable instructions) stored on computer-readable storage memory, such as any suitable memory device or electronic data storage. The stop-motion video service 144 implements the techniques for stop-motion video creation from full-motion video, as described with reference to the stop-motion video application 112 that is implemented by the computing device 102. For example, the stop-motion video service 144 can receive the video content 106 as the animation sequence 114 from the computing device 102, determine the motion frames 122 of the animation sequence, and discard the motion frames, thus leaving the static frames 124. The stop-motion video service 144 can then generate a frame sequence of the static frames 124 as a stop-motion video 146 that depicts an animation object to appear being created or moving without the manipulations. The stop-motion video 146 can then be downloaded and/or played back for viewing at a requesting computing device.

Any of the devices, servers, and/or services described herein can communicate via a network 148, such as for data communication between the computing device 102 and the Web service 142. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Figure 2:
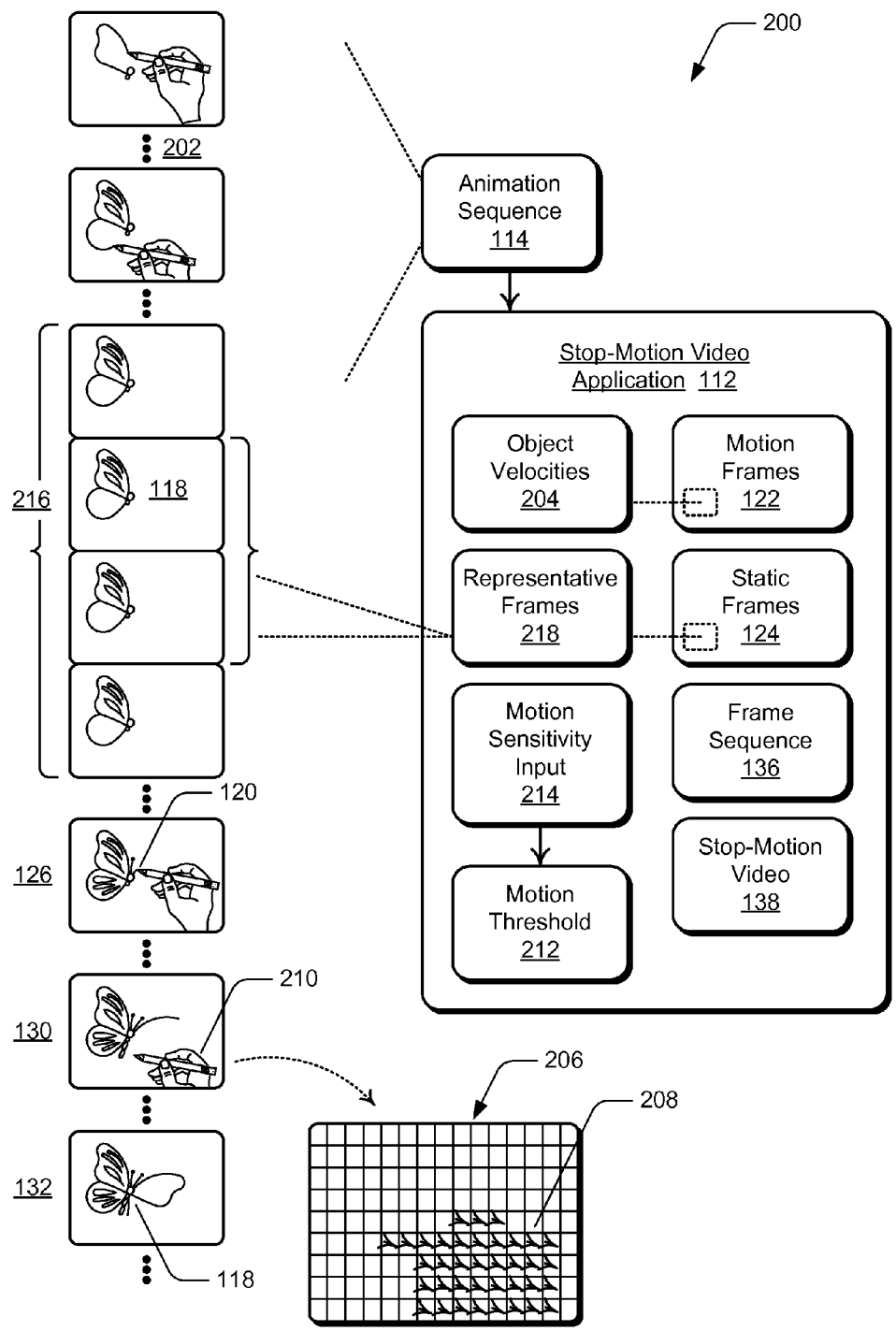
FIG. 2 illustrates an example of an animation sequence filmed as a full-motion video, from which a stop-motion video can be created in accordance with one or more embodiments.

FIG. 2 further illustrates an example 200 of the stop-motion video application 112 and the animation sequence 114 that is filmed as the video content 106 with the camera device 104 (e.g., a video camera), as described with reference to FIG. 1. As noted above, the animation sequence shows only a few of the image frames of the video content 106 simply for discussion and illustrative purposes, and the video content 106 of the animation sequence 114 would include several hundred or thousands of image frames, as represented by the ellipsis 202 between the image frames of the video.

In embodiments, the stop-motion video application 112 can determine the motion frames 122 based on object velocities 204 of objects that are captured when the video is being filmed. For example, as shown in the motion frames 126 and 130, an artist's hand (e.g., an object that appears in the image frames) may enter into the viewable area of the video, add a small drawing stroke 120 to the sketch, and then leave the viewable area of the video. These are all examples of motion that is captured when the video is being filmed, and the motion frames 122 have objects with object velocities 204 that are greater than zero velocity. The object velocities corresponding to the static frames 124 of the frame sequence 136 used to generate the stop-motion video 138 are zero velocities, where the static frames have no detectable motion.

The stop-motion video application 112 can utilize a motion-vectors technique for motion estimation to determine the motion frames 122. A motion vectors example 206 depicts the motion vectors 208 that correspond to the motion of the artist's hand 210 in the motion frame 130 (e.g., as the artist's hand moves into, or out of, the viewable area of the image frame). The motion vectors 208 of the motion frame 130 represent the displacement of macroblocks (e.g., pixels) in the video frame, where the position of a macroblock in another, reference frame is compared, such as compared to the video frame occurring just before the motion frame 130 in the animation sequence. A comparison of the motion frame 130 to the reference frame provides the indication of perceived movement at pixel locations between the image frames of the video content. In embodiments, multiple motion vector points (e.g., five-hundred, or similar) can be used to calculate the level of activity from one image frame to the next, and velocity is represented by the displacement of the macroblocks in the image frames. A higher velocity is indicated by more displacement of the macroblocks, and thus, a higher level of change in the activity and motion is determined.

The stop-motion video application 112 can also be implemented to determine the motion frames 122 based on a motion threshold 212 (e.g., as in a range from no detected motion to user-perceptible motion), where an image frame having the slightest of motion may be used in the frame sequence 136 along with the static frames 124 to generate the stop-motion video 138. For example, a video frame in the animation sequence 114 may be determined as a motion frame based on subtle motion that is captured in the video, such as a shadow of the artist's hand that enters into the viewable area of the video before the hand or other object is viewable. The motion frame 122 that includes the subtle motion of the shadow may be used as a static frame in the frame sequence, and the subtle motion will likely be imperceptible to a viewer of the stop-motion video 138. Additionally, a motion sensitivity input 214 can be received from a user to set or change the motion threshold 212, such as to use motion frames that have a bit more than just an imperceptible subtle motion, and the frame sequence of the static frames can then include one or more of the motion frames 122 that have the object velocities 204 that are greater than the zero velocities of the static frames 124.

In embodiments of the described techniques, a group 216 of the static frames 124 that depict the animation object 118 the same can be determined, such as for several, consecutive image frames of the video that show the animation object without any change or movement. One or more of the static frames 124 from the group 216 can then be selected as representative frames 218 that depict the animation object the same in the stop-motion video 138. In other embodiments, an input can be received as a duration of time over which the stop-motion video will playback for viewing, such as if a user designates a thirty-second video, a one-minute video, or similar. The number of the static frames 124 in the frame sequence 136 can then be selected based on the designated duration of time. For example, a fewer number of the static frames 124 in the frame sequence 136 will be selected for the thirty-second video than for the one-minute video. Alternatively, more of the static frames 124 will be selected for the frame sequence 136 for a longer video and, optionally, may include one or more of the motion frames 122 that have the object velocities 204 that are greater than the zero velocities based on the change to the motion threshold 212, as described above.

Figure 3:
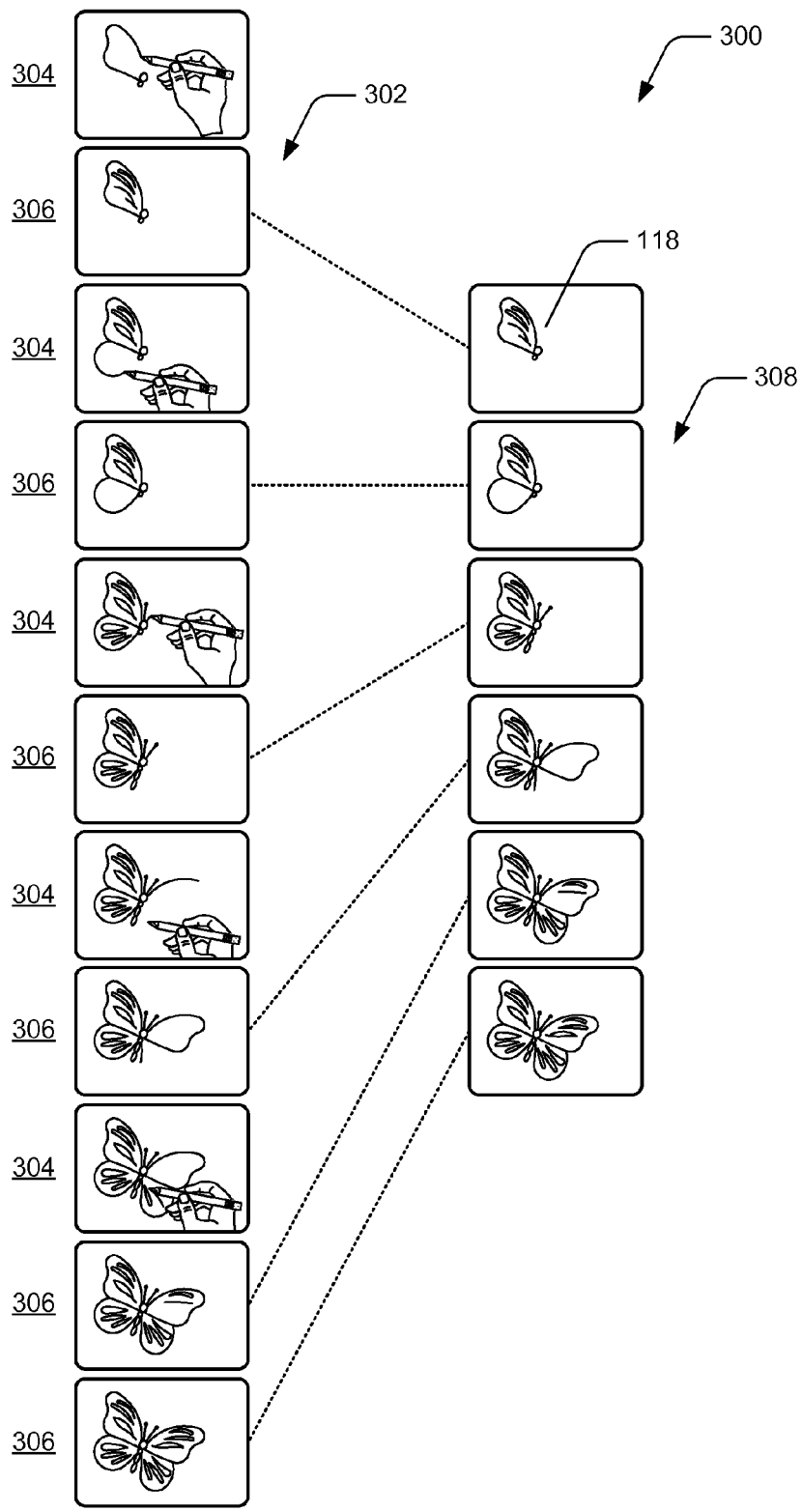
FIG. 3 further illustrates an example of creating a stop-motion video from a full-motion video in accordance with one or more embodiments.

FIG. 3 further illustrates an example 300 of the animation sequence 114 and the static frames 124 used by the stop-motion video application 112 to generate the frame sequence 136 as the stop-motion video 138, as described with reference to FIGS. 1 and 2. An example of the animation sequence is shown at 302, which includes image frames 304 that are determined by the stop-motion video application 112 as the motion frames 122. The animation sequence also includes image frames 306, which are the static frames 124 having no detectable motion by the stop-motion video application. The stop-motion video application 112 can determine the motion frames (e.g., the image frames 304) of the animation sequence and discard the motion frames, thus leaving the static frames (e.g., the image frames 306). As shown at 308, the stop-motion video application 112 can then generate the frame sequence 136 of the static frames as the stop-motion video 138 that depicts the animation object 118 to appear being created without the manipulations that are seen in the motion frames. Further as noted above, the example shown at 308 of the frame sequence illustrates only a few static frames simply for discussion purposes, and would include several hundred or thousands of the static frames in the frame sequence to generate the stop-motion video.

Example methods 400 and 500 are described with reference to respective FIGS. 4 and 5 in accordance with one or more embodiments of stop-motion video creation from full-motion video. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage memory that is local and/or remote to a computer processing system, and implementations can include software applications, programs, functions, and the like.

Figure 4:
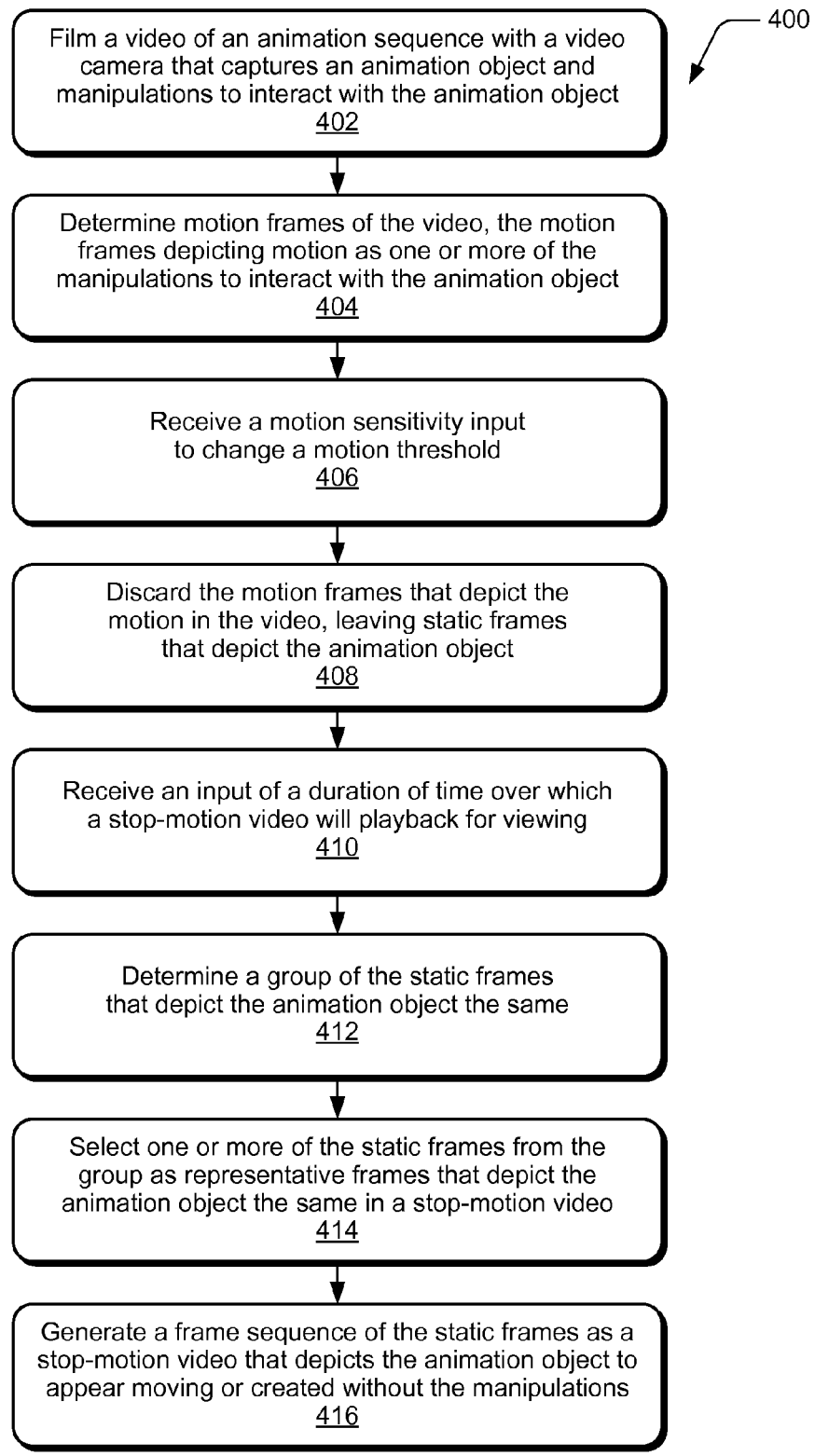
FIGS. 4 and 5 illustrate example methods of the embodiments for stop-motion video creation from full-motion video.

FIG. 4 illustrates example method(s) 400 of stop-motion video creation from full-motion video, and is generally described with reference to the example computing device shown in FIG. 1. The order in which the method is described is not intended to be construed as a limitation, and any number or combination of the method operations can be combined in any order to implement a method, or an alternate method.

At 402, a video of an animation sequence is filmed with a video camera that captures an animation object and manipulations to interact with the animation object. For example, the camera device 104 (e.g., a video camera) of the computing device 102 (FIG. 1) films the video content 106 of the animation sequence 114, and the video captures the animation object 118 and the manipulations to interact with the animation object. The animation object may be a sketch, and the manipulations are filmed as the individual drawing strokes of the sketch. Alternatively, the animation object may be a three-dimensional (3D) object, and the manipulations are filmed as the 3D object is being moved or as a part of the 3D object is being moved.

At 404, motion frames of the video are determined, where the motion frames depict motion as one or more of the manipulations to interact with the animation object. For example, the stop-motion video application 112 that is implemented by the computing device 102 determines the motion frames 122 of the video content 106, where the motion frames depict motion that is filmed as the manipulations to interact with the animation object. In the sketch example, the motion frames 122 depict the motion of an artist's hand drawing the individual strokes, and the static frames 124 depict the individual drawing strokes completed after having been drawn. In the 3D object example, the motion frames 122 depict the motion of the 3D object or the part of the 3D object being moved, and the static frames 124 depict the 3D object after the 3D object or the part of the 3D object has been moved. As described, the stop-motion video application 112 determines the motion frames 122 based on objects having the object velocities 204 that are captured when the video content 106 is being filmed, and can utilize the motion-vectors technique for motion estimation to determine the motion frames.

The motion frames 122 can also depict other motion than the manipulations to interact with the animation object 118, where the other motion is captured when the video content 106 is filmed. For example, other subtle motion may also be captured in the video, such as a shadow of the artist's hand that enters into the viewable area of the video before the hand is viewable. In embodiments, the motion frames 122 are determined based on the velocities of objects that are captured in image frames of the video when the video is being filmed, and the velocities corresponding to the static frames are zero velocities. Further, the motion frames can be determined based on the motion threshold 212, where the motion frames 122 have the velocities that are greater than the zero velocities.

At 406, a motion sensitivity input is received to change a motion threshold. For example, the stop-motion video application 112 receives the user-selectable motion sensitivity input 214 to change the motion threshold 212. The stop-motion video application can then determine the motion frames 122 based on the motion threshold 212, where an image frame having the slightest of motion may be used in the frame sequence 136 along with the static frames 124 to generate the stop-motion video 138. For example, a video frame in the animation sequence 114 may be determined as a motion frame based on subtle motion that is captured in the video, such as a shadow of the artist's hand that enters into the viewable area of the video before the hand or other object is viewable. The motion frame 122 that includes the subtle motion of the shadow may be used as a static frame in the frame sequence, and will likely be imperceptible to a viewer of the stop-motion video 138. The frames sequence 136 can be generated as the stop-motion video 138. However, in this implementation, the frames sequence 136 includes the static frames 124 as well as one or more of the motion frames 122 having the velocities that are greater than the zero velocities based on the change to the motion threshold.

At 408, the motion frames that depict the motion in the video are discarded, leaving static frames that depict the animation object. For example, the stop-motion video application 112 discards the motion frames 122 from the video (e.g., the animation sequence 114), leaving the static frames 124 that depict the animation object 118 with no detectable motion. The animation sequence shown in the example at 116 (FIG. 1) includes the static frames 132 and 134 that depict the individual strokes of the sketch completed after having been drawn. Further, there is no other detectable motion in the static frames 132 and 134 of the animation sequence.

At 410, an input is received as a duration of time over which a stop-motion video will playback for viewing. For example, the stop-motion video application 112 receives a user-selectable input as a duration of time over which the stop-motion video 138 will playback for viewing, such as if a user designates a thirty-second video, a one-minute video, or similar. The number of the static frames 124 in the frame sequence 136 can then be selected based on the designated duration of time. For example, a fewer number of the static frames 124 in the frame sequence 136 will be selected for the thirty-second video than for the one-minute video. Alternatively, more of the static frames 124 will be selected for the frame sequence 136 for a video of longer duration.

At 412, a group of the static frames that depict the animation object the same are determined. For example, the stop-motion video application 112 determines a group 216 (FIG. 2) of image frames that are static frames 124 depicting the animation object 118 the same, such as for several, consecutive image frames of the video that show the animation object without any change or movement.

At 414, one or more of the static frames are selected from the group as representative frames that depict the animation object the same in the stop-motion video. For example, the stop-motion video application 112 selects one or more of the static frames 124 from the group 216 as the representative frames 218 that depict the animation object 118 the same in the stop-motion video 138. The number of the static frames 124 in the frame sequence 136 can be selected based on the user-selectable duration of time. For example, a fewer number of the representative frames 218 in the frame sequence 136 will be selected for the thirty-second video, whereas more of the representative frames 218 will be selected for the frame sequence 136 for a video of longer duration.

At 416, a frame sequence of the static frames is generated as a stop-motion video that depicts the animation object to appear moving or created without the manipulations. For example, the stop-motion video application 112 generates the frame sequence 136 of the static frames 124 as the stop-motion video 138 that depicts an animation object to appear moving or being created without the manipulations. For example, the frame sequence 136 can include the static frames 124 that depict the sketch of the animation object 118 being created without the manipulations, and the frame sequence can be played back for viewing as the stop-motion video 138. Similarly, the frame sequence 136 can include the static frames 124 that depict a 3D object, or a part of the 3D object, moving without the manipulations to interact with the 3D object.

Figure 5:
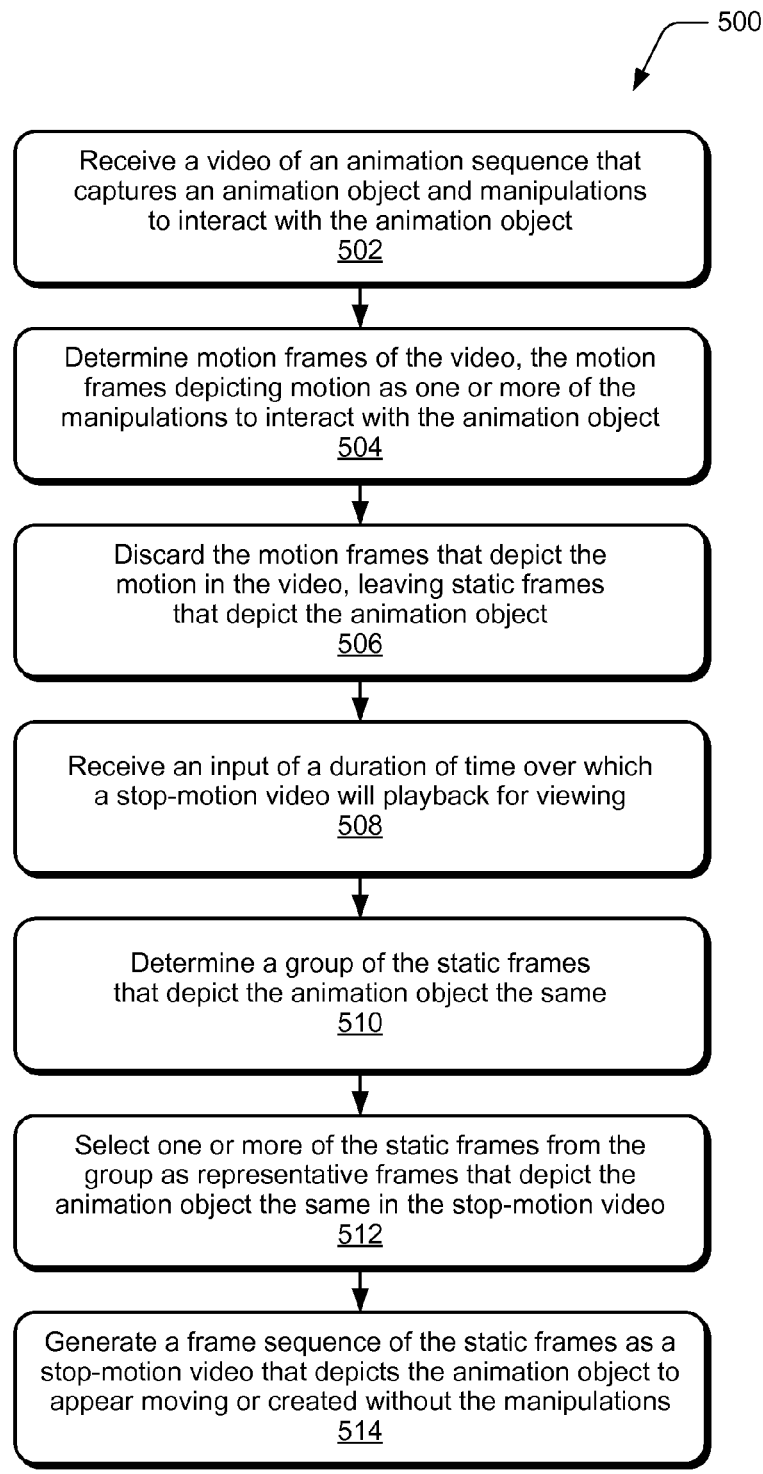

FIG. 5 illustrates example method(s) 500 of stop-motion video creation from full-motion video, and is generally described with reference to a Web-based service as shown in FIG. 1. The order in which the method is described is not intended to be construed as a limitation, and any number or combination of the method operations can be combined in any order to implement a method, or an alternate method.

At 502, a video is received of an animation sequence that captures an animation object and manipulations to interact with the animation object. For example, the Web service 142 (FIG. 1) receives the video content 106 of the animation sequence 114 from the computing device 102 via the network 148. The video content 106 of the animation sequence 114 captures the animation object 118 and the manipulations to interact with the animation object. The animation object may be a sketch, and the manipulations are filmed as the individual drawing strokes of the sketch. Alternatively, the animation object may be a three-dimensional (3D) object, and the manipulations are filmed as the 3D object is being moved or as a part of the 3D object is being moved.

At 504, motion frames of the video are determined, where the motion frames depict motion as one or more of the manipulations to interact with the animation object. For example, the Web service 142 implements the stop-motion video service 144 that determines the motion frames 122 of the video content 106, where the motion frames depict motion that is filmed as the manipulations to interact with the animation object. The motion frames 122 can also depict other motion than the manipulations to interact with the animation object, where the other motion is captured when the video content 106 is filmed. As described, the stop-motion video service 144 determines the motion frames 122 based on objects having the object velocities 204 that are captured when the video content 106 is being filmed, and can utilize the motion-vectors technique for motion estimation to determine the motion frames.

At 506, the motion frames that depict the motion in the video are discarded, leaving static frames that depict the animation object. For example, the stop-motion video service 144 discards the motion frames 122 from the video (e.g., the animation sequence 114), leaving the static frames 124 that depict the animation object 118 with no detectable motion.

At 508, an input is received as a duration of time over which a stop-motion video will playback for viewing. For example, the Web service 142 receives a user input from the computing device 102, where the user input sets a duration of time over which the stop-motion video 138 will playback for viewing, such as if a user designates a thirty-second video, a one-minute video, or similar. The number of the static frames 124 in the frame sequence 136 can then be selected based on the designated duration of time. For example, a fewer number of the static frames 124 in the frame sequence 136 will be selected for the thirty-second video than for the one-minute video. Alternatively, more of the static frames 124 will be selected for the frame sequence 136 for a video of longer duration.

At 510, a group of the static frames that depict the animation object the same are determined. For example, the stop-motion video service 144 determines a group 216 (FIG. 2) of image frames that are static frames 124 depicting the animation object 118 the same, such as for several, consecutive image frames of the video that show the animation object without any change or movement.

At 512, one or more of the static frames are selected from the group as representative frames that depict the animation object the same in the stop-motion video. For example, the stop-motion video service 144 selects one or more of the static frames 124 from the group 216 as the representative frames 218 that depict the animation object 118 the same in the stop-motion video 138. The number of the static frames 124 in the frame sequence 136 can be selected based on the user-selectable duration of time. For example, a fewer number of the representative frames 218 in the frame sequence 136 will be selected for the thirty-second video, whereas more of the representative frames 218 will be selected for the frame sequence 136 for a video of longer duration.

At 514, a frame sequence of the static frames is generated as a stop-motion video that depicts the animation object to appear moving or created without the manipulations. For example, the stop-motion video service 144 generates the frame sequence 136 of the static frames 124 as the stop-motion video 146 that depicts an animation object to appear moving or being created without the manipulations. For example, the frame sequence 136 can include the static frames 124 that depict the sketch of the animation object 118 being created without the manipulations, and the frame sequence can be played back for viewing as the stop-motion video 146. Similarly, the frame sequence 136 can include the static frames 124 that depict a 3D object, or a part of the 3D object, moving without the manipulations to interact with the 3D object. The stop-motion video 146 can then be downloaded and/or played back for viewing at a requesting computing device.

Figure 6:
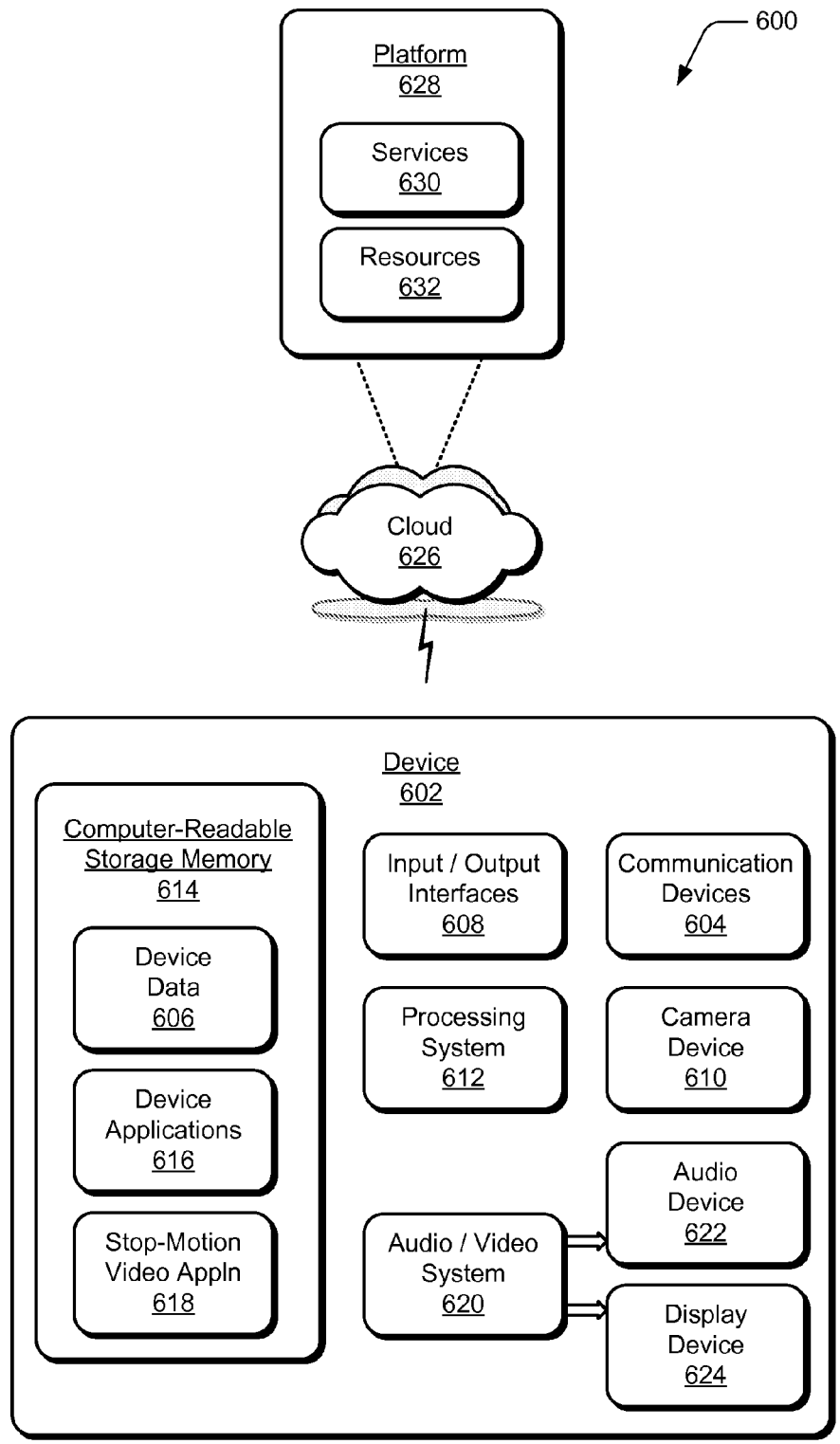
FIG. 6 illustrates an example system with an example device that can implement one or more embodiments for stop-motion video creation from full-motion video.

FIG. 6 illustrates an example system 600 that includes an example device 602, and in which techniques for stop-motion video creation from full-motion video can be implemented. The example device 602 can be implemented as any of the computing devices and/or services (e.g., server devices) described with reference to the previous FIGS. 1-5, such as any type of computing device, client device, camera device, mobile phone, tablet, communication, entertainment, gaming, media playback, and/or other type of device. For example, the computing device 102 and/or the camera device 104, as well as the Web service 142, shown in FIG. 1 may be implemented as the example device 602.

The device 602 includes communication devices 604 that enable wired and/or wireless communication of device data 606, such as video content and image frames of the video content that is transferred from one computing device to another, and/or synched between multiple computing devices. The device data 606 can include any type of audio, video, and/or image data, such as application data that is generated by applications executing on the device. The communication devices 604 can also include transceivers for cellular phone communication and/or for network data communication.

The device 602 also includes data input/output (I/O) interfaces 608, such as data ports and data network interfaces that provide connection and/or communication links between the device, data networks, and other devices. The I/O interfaces can be used to couple the device to any type of components, peripherals, and/or accessory devices, such as a digital camera device 610 that may be integrated with the device 602. The I/O interfaces also include data input ports via which any type of data, media content, and/or inputs can be received, such as user inputs to the device, as well as any type of audio, video, and/or image data received from any content and/or data source.

The device 602 includes a processing system 612 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage memory 614, such as data storage devices that can be accessed by a computing device, and that provide persistent storage of data and executable instructions (e.g., software applications, modules, programs, functions, and the like). Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 614 provides storage of the device data 606 and various device applications 616, such as an operating system that is maintained as a software application with the computer-readable storage memory and executed by the processing system 612. In this example, the device applications also include a stop-motion video application 618 that implements the described techniques for stop-motion video creation from full-motion video, such as when the example device 602 is implemented as the computing device 102 shown in FIG. 1. Examples of the stop-motion video application 618 includes the stop-motion video application 112 that is implemented by the computing device 102 and/or the stop-motion video service 144 that is implemented by the Web service 142, as described with reference to FIGS. 1-5.

The device 602 also includes an audio and/or video system 620 that generates audio data for an audio device 622 and/or generates display data for a display device 624. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device.

In embodiments, at least part of the techniques described for stop-motion video creation from full-motion video may be implemented in a distributed system, such as over a "cloud" 626 in a platform 628. The cloud 626 includes and/or is representative of the platform 628 for services 630 and/or resources 632. For example, the services 630 and/or resources 632 may include the Web service 142 and the stop-motion video service 144 shown in FIG. 1 and described with reference to FIGS. 1-5.

The platform 628 abstracts underlying functionality of hardware, such as server devices (e.g., implemented by the Web service 142 and included in the services 630) and/or software resources (e.g., included as the resources 632), and connects the example device 602 with other devices, servers, etc. The resources 632 may also include applications and/or data that can be utilized while computer processing is executed on servers that are remote from the example device 602. Additionally, the services 630 and/or the resources 632 may facilitate subscriber network services, such as over the Internet, a cellular network, or Wi-Fi network. The platform 628 may also serve to abstract and scale resources to service a demand for the resources 632 that are implemented via the platform, such as in an interconnected device embodiment with functionality distributed throughout the system 600. For example, the functionality may be implemented in part at the example device 602 as well as via the platform 628 that abstracts the functionality of the cloud 626.

Although embodiments of stop-motion video creation from full-motion video have been described in language specific to features and/or methods, the appended claims are not necessarily limited to the specific features or methods described. Rather, the specific features and methods are disclosed as example implementations of stop-motion video creation from full-motion video.

The invention claimed is:

1. A method, comprising:
   filming a video of a continuous animation sequence with a video camera that captures an animation object and manipulations to interact with the animation object, the continuous animation sequence including video frames having detectable motion and additional video frames without the detectable motion;
   determining motion frames as the video frames having the detectable motion, the motion frames depicting the manipulations to interact with the animation object;
   discarding the motion frames having the detectable motion in the video, leaving static frames that each depict a still image of the animation object without the detectable motion; and
   generating a frame sequence of the static frames as a stop-motion video that depicts the animation object to appear moving or created without the manipulations.

2. The method as recited in claim 1, wherein the motion frames include other detectable motion than the manipulations to interact with the animation object, the other detectable motion captured when said filming the video.

3. The method as recited in claim 1, further comprising:
   determining a group of the static frames that each depict the animation object as the same still image; and
   selecting one or more of the static frames from the group as representative frames that depict the animation object as the same still image in the stop-motion video.

4. The method as recited in claim 1, further comprising:
   receiving an input of a duration of time over which the stop-motion video will playback for viewing; and
   selecting a number of the static frames in the frame sequence based on the selected duration of time.

5. The method as recited in claim 1, wherein:
   the animation object includes a sketch;
   the manipulations comprise individual strokes of the sketch;
   the motion frames depict the detectable motion of drawing the individual strokes; and
   the static frames depict the individual strokes completed after having been drawn.

6. The method as recited in claim 1, wherein:
   the animation object includes a three-dimensional (3D) object;
   the manipulations comprise at least one of the 3D object or a part of the 3D object being moved;
   the motion frames depict the detectable motion of the 3D object or the part of the 3D object being moved; and
   the static frames depict the 3D object after the 3D object or the part of the 3D object has been moved.

7. The method as recited in claim 1, wherein:
   said determining the motion frames as the video frames having the detectable motion is based on velocities of moving objects that are captured when said filming the video; and
   the velocities corresponding to the static frames are zero velocities.

8. The method as recited in claim 7, wherein said determining the motion frames is further based on a motion threshold, the motion frames having the velocities that are greater than the zero velocities.

9. The method as recited in claim 8, further comprising:
   receiving a motion sensitivity input to change the motion threshold; and
   wherein the frame sequence of the static frames includes one or more of the motion frames having the velocities that are greater than the zero velocities based on the change to the motion threshold.

10. A device, comprising:
    a video camera configured to film a video of a continuous animation sequence, and capture an animation object and manipulations to interact with the animation object, the continuous animation sequence including video frames having detectable motion and additional video frames without the detectable motion;
    a processor system to implement a stop-motion video application that is configured to:
    determine motion frames as the video frames having the detectable motion, the motion frames depicting the manipulations to interact with the animation object;
    discard the motion frames having the detectable motion in the video, leaving static frames that each depict a still image of the animation object without the detectable motion; and
    generate a frame sequence of the static frames as a stop-motion video that depicts the animation object to appear moving or created without the manipulations.

11. The device as recited in claim 10, wherein the motion frames include other detectable motion than the manipulations to interact with the animation object, the other detectable motion captured when the video is filmed.

12. The device as recited in claim 10, wherein the stop-motion video application is configured to:
    determine a group of the static frames that each depict the animation object as the same still image; and select one or more of the static frames from the group as representative frames that depict the animation object as the same still image in the stop-motion video.

13. The device as recited in claim 10, wherein the stop-motion video application is configured to select a number of the static frames in the frame sequence based on a duration of time over which the stop-motion video will playback for viewing.

14. The device as recited in claim 10, wherein:
the animation object includes a sketch;
the manipulations comprise individual strokes of the sketch;
the motion frames depict the detectable motion of drawing the individual strokes; and
the static frames depict the individual strokes completed after having been drawn.

15. The device as recited in claim 10, wherein:
the animation object includes a three-dimensional (3D) object;
the manipulations comprise at least one of the 3D object or a part of the 3D object being moved;
the motion frames depict the detectable motion of the 3D object or the part of the 3D object being moved; and
the static frames depict the 3D object after the 3D object or the part of the 3D object has been moved.

16. The device as recited in claim 10, wherein:
the stop-motion video application is configured to said determine the motion frames as the video frames having the detectable motion based on velocities of moving objects that are captured when the video is filmed;
the velocities corresponding to the static frames are zero velocities; and
the motion frames have the velocities that are greater than the zero velocities.

17. A computer-readable storage memory comprising a stop-motion video application stored as instructions that are executable and, responsive to execution of the instructions by a computing device, performing operations comprising to:
receive a video of a continuous animation sequence that captures an animation object and manipulations to interact with the animation object, the continuous animation sequence including video frames having detectable motion and additional video frames without the detectable motion;
determine motion frames as the video frames having the detectable motion, the motion frames depicting the manipulations to interact with the animation object;
discard the motion frames having the detectable motion in the video, leaving static frames that each depict a still image of the animation object without the detectable motion; and
generate a frame sequence of the static frames as a stop-motion video that depicts the animation object to appear moving or created without the manipulations.

18. The computer-readable storage memory as recited in claim 17, wherein the operations further comprise:
select a number of the static frames in the frame sequence based on a duration of time over which the stop-motion video will playback for viewing.

19. The computer-readable storage memory as recited in claim 17, wherein the operations further comprise:
determine a group of the static frames that each depict the animation object as the same still image; and
select one or more of the static frames from the group as representative frames that depict the animation object as the same still image in the stop-motion video.

20. The computer-readable storage memory as recited in claim 17, wherein the operations comprise:
said determine the motion frames as the video frames having the detectable motion based on velocities of moving objects that are captured when the video is filmed, wherein the velocities corresponding to the static frames are zero velocities and the motion frames have the velocities that are greater than the zero velocities.

* * * * *